United States Patent Office
3,600,396
Patented Aug. 17, 1971

3,600,396
ALPHA-DILOWER ALKYL AMINO - 2,6 - DI-(p-CHLOROPHENYL) - 4-PYRIDINE METHANOLS AND DERIVATIVES THEREOF
Arthur B. Ash, Detroit, Calvin L. Stevens, Troy, and Anica Markovac, Lathrup Village, Mich., assignors to the United States of America
No Drawing. Filed Dec. 17, 1968, Ser. No. 784,467
Int. Cl. C07d 31/42
U.S. Cl. 260—296R    4 Claims

ABSTRACT OF THE DISCLOSURE

Antimalarial compounds characterized as alpha-dilower alkylaminomethyl-2,6-di(p-chlorophenyl)-pyridine methanols (VIII) and nontoxic, pharmaceutically acceptable amine acid addition salts are described. These compounds can be prepared by conventional methods. They are preferably prepared by reacting 4-picoline N-oxide with p-chlorophenyl magnesium bromide Grignard reagent to produce 2-p-chlorophenyl-4-picoline (I). (I) was converted to the N-oxide (I)(a) again and reacted with the Grignard reagent again to give 2,6-di-(p-chlorophenyl)-4-picoline (II). Alternatively, (II) may be prepared in one step by adopting a method reported in W. Zecher and F. Krohnke, Chemische Berichte, 94, 698–706 (1961), for the preparation of 2,6-diphenyl-4-picoline, 4,6-diphenyl-2-picoline and 4 - p-nitrophenyl-6-phenyl-2-picoline. This involves reacting a mixture of p-chlorocrotonophenone, p-chlorophenacyl pyridinium bromide, ammonium acetate, glacial acetic acid and acetic anhydride at temperatures up to reflux to effect a ring closure reaction which yields (II) on workup. (II) was oxidized to the corresponding isonicotinic acid which is 2,6-di-(p-chlorophenyl) pyridine-4-carboxylic acid (III) preferably with potassium permanganate. (III) was converted to the corresponding acid chloride (IV) by reaction with thionyl chloride and (IV) was then reacted with diazomethane to produce diazomethyl-2,6-di-(p-chlorophenyl)-4-pyridyl ketone (V). (V) was then reacted with hydrobromic acid to yield alpha-bromomethyl - 2,6-di-(p-chlorophenyl)-4-pyridyl ketone (VI). (VI) was reduced with a hydride such as sodium borohydride to produce bromomethyl - 2,6-di-(p-chlorophenyl)-4-pyridine methanol (VII). (VII) was converted to the antimalarial compounds (VIII) by reaction with a lower alkyl amine in a polar organic solvent. The antimalarial compounds have been shown to be very effective in treating malaria of various types in mammals.

BACKGROUND OF THE INVENTION

The present invention relates to antimalarial compounds and the process of their preparation. More particularly the present invention relates to alpha-dilower alkylamino methyl-2,6-di(p-chlorophenyl)-4-pyridine methanols and non-toxic, pharamaceutically acceptable acid addition salts, their preparation and use as antimalarial compounds.

The prior art has shown that alpha-dibutylamino methyl-2,6-diphenyl-4-pyridine methanol as the hydrochloride salt exhibited some activity as an antimalarial (F. Y. Wiselogle, "A Survey of Antimalaria Drugs 1941 to 1945" Edwards, Ann Arbor, Mich. (1946)). However, this compound which is unsubstituted in the para phenyl position was bypassed by the art in favor of more active compounds.

OBJECTS

It is therefore an object of the present invention to provide novel alpha-dilower alkylamino methyl-2,6-disubstituted phenyl-4-pyridine methanols and non-toxic pharmaceutically acceptable acid addition salts which are very active antimalarials and in some instances produce what are characterized as cures in mammals such as mice.

It is further an object of the present invention to provide a process for the preparation of such compounds.

These and other objects will become increasingly apparent to those skilled in the art by reference to the following description.

SUMMARY OF THE INVENTION

The present invention relates to alpha-dilower alkylamino methyl - 2,6-di(p-chlorophenyl)-4-pyridine methanols and non-toxic, pharmaceutically acceptable acid addition salts which are particularly useful as antimalarials in mammals of the structural formula:

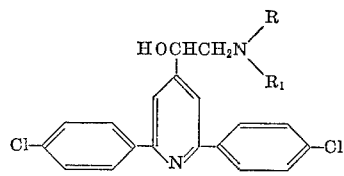

wherein R and $R_1$ are lower alkyl containing 1 to 6 carbon atoms. Particularly preferred are compounds where R and $R_1$ are both butyl or hexyl. Non-toxic salts include those formed by acids such as hydrochloric, hydrobromic, hydriodic, sulfuric, phosphoric, acetic, citric, tartaric and p-toluene sulfonic acid and the like although hydrochloric is preferred.

The antimalarial compounds of the present invention are prepared by the process which comprises: (a) reacting a dilower alkyl amine with a solution of alpha-bromomethyl 2,6-di-(p-chlorophenyl)-4-pyridine methanol in an organic solvent and (b) separating the product.

The present invention also relates to the process for the preparation of the novel intermediate 2,4-di-(p-chlorophenyl)-4-picoline, useful for conversion to the antimalarial compounds of the present invention, which comprises: sequentially reacting 4-picoline-N-oxide and 2-(p-chlorophenyl)-4-picoline N-oxide with p-chlorophenyl Grignard reagent. This intermediate can be converted by varying techniques generally known in the prior art via the methyl group on the 4-position of pyridine ring to alpha-bromomethyl 2,6 - di-(p-chlorophenyl)-4-picoline methanol used to produce the antimalarial compounds of the invention.

DESCRIPTION OF THE INVENTION

The preparation of 2,4-di-(p-chlorophenyl)-4-picoline used as a starting material for the preparation of the compounds of the present invention is unknown. The reaction of phenyl magnesium bromide and 4-picoline-N-oxide to give 2-phenyl-4-picoline is known. (T. Kato and Y. Yamavaka, J. Org. Chem., 30, 910 (1965)). The preparation of chlorophenyl magnesium bromide is also known (Organic Synthesis, volume III, page 200). The preparation of 2-(p-chlorophenyl)-4-picoline using these techniques is however unknown in the art. The conversion of 2-(p-chlorophenyl)-4-picoline to the corresponding N-oxide is also unknown but can be accomplised by known oxidation processes, such as by the use of hydrogen peroxide. The procedure is repeated for conversion of 2-(p-chlorophenyl)-4-picoline N-oxide by the reaction of p-chlorophenyl Grignard reagent to obtain 2,4-di(p-chlorophenyl)-4-picoline which can be converted to antimalarial compounds of the present invention.

The 2,4-di-(p-chlorophenyl)-4-picoline is converted to the antimalarial compounds. This is preferably accomplished by forming bromomethyl-2,6-di(p-chlorophenyl)-4-pyridine methanol and then reacting this compound with a lower alkyl amine. Alpha-bromomethyl-2,6-di-(p-chlorophenyl)-4-pyridine methanol can be formed by various conventional means.

The following sequence of reactions is preferred. In the equations P represents p-chlorophenyl.

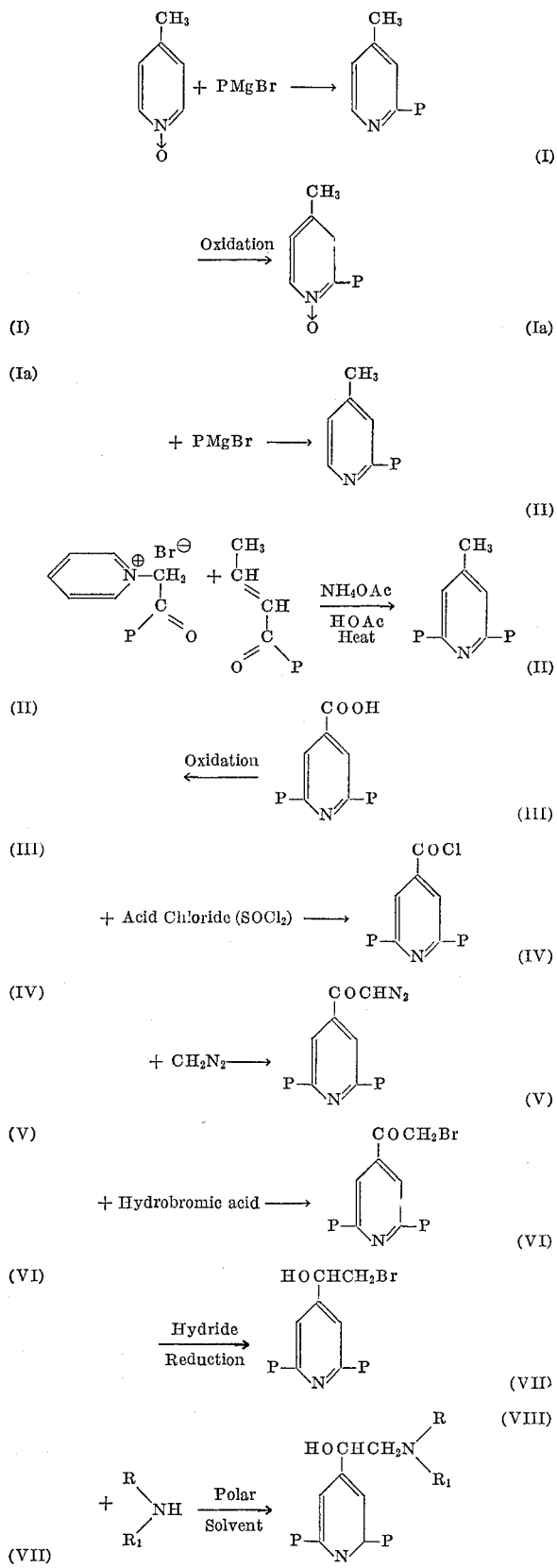

Having generally described the present invention, the following is a specific description.

SPECIFIC DESCRIPTION

The following Examples 1 and 2 illustrate the preferred process for the preparation of the antimalarial compounds of the present invention. Temperatures shown are in degrees centigrade.

EXAMPLE I 2-(p-chlorophenyl)-4-picoline (I)

A solution of p-chlorophenyl magnesium bromide was prepared under a nitrogen atmosphere as an unreactive gaseous atmosphere from magnesium (25.4 g. 1.05 g.-atom) and 1-bromo-4-chlorobenzene (200 g. 1.05 mole) in dry tetrahydrofuran (THF). The Grignard solution was cooled to 0° and 4-picoline-N-oxide (91.0 g. 0.83 mole) was added in 10 g. portions over a period of one hour. The mixture was stirred at 0° under nitrogen for three hours and allowed to stand at room temperature for 16 hours. Water was added until a pasty solid settled out. The THF was decanted and the residue was washed thoroughly with chloroform by decantation. The combined chloroform and THF extracts were concentrated to a mushy brown solid. This residue was dissolved in acetic anhydride (300 ml.) and the solution was slowly heated to reflux. As the mixture was heated, a vigorous exotherm was observd. The mixture was refluxed for three hours and the acetic anhydride was removed under reduced pressure. The resulting brown residue was dissolved in ether and was washed with aqueous potassium carbonate. The ether solution was then extracted five times with 100 ml. portions of 10% aqueous hydrochloric acid. The acid extracts were made basic with potassium hydroxide and extracted (five times) with 150 ml. portions of petroleum ether. The combined petroleum ether extracts were dried (potassium carbonate), filtered and passed through a 30 cm. by 30 mm. column packed with Woelm (activity grade 1) neutral alumina. (This is essentially a filtration procedure.) After washing the alumina extensively with petroleum ether, the solvent was removed under aspirator pressure to give 34 g. (21%) of white solid (I), melting point 60–63°. A sample was recrystallized twice from petroleum ether at −80° to give needles, melting point 63–64°.

Analysis.—Calculated for $C_{12}H_{10}ClN$ (percent): C, 70.76; H, 4.95; Cl, 17.41. Found (percent): C, 70.67; H, 5.16; Cl, 17.21.

2-(p-chlorophenyl)-4-picoline-N-oxide (Ia)

A solution of 2-(p-chlorophenyl)-4-picoline (21.7 g. 0.097 mole) in glacial acetic acid (80 ml.) and 30% hydrogen peroxide (12 ml.) was heated four hours on a steam bath. An additional 12 ml. of 30% hydrogen peroxide was added and the solution was heated at 100° for two days. The mixture was poured onto one kilogram of crushed ice. A crystalline hydrate was formed which was filtered and washed with water. The filtrate was extracted with chloroform four times. Chloroform was removed from the extract and water was added to the resulting syrup to give a second crop of the hydrate. This material was filtered, washed with water and combined with the first crop. The combined crops were azeotroped with benzene at atmospheric pressure using a Dean-Stark separator until all of the water of hydration was removed. The benzene was removed under reduced pressure. Toluene (100 ml.) was added and removed at reduced pressure to give 19.0 g. (32%) of a yellow syrup (Ia). The infrared spectrum of the product showed a strong N-oxide absorption at 8.2 microns. The product was not characterized further. Analysis of the hydrate may be the best approach.

2,6-di-(p-chlorophenyl)-4-picoline (II)

A 500 ml. three-necked flask was equipped with a mechanical stirrer, dropping funnel and condenser connected to a source of dry nitrogen. This equipment was thoroughly dried and subsequent manipulations were carried out under a nitrogen atmosphere. Magnesium (3.0 g. 0.13 g.-atom), a crystal of iodine and tetrahydrofuran (20 ml.) were placed in the flask. A few drops of a solution of 1-bromo-4-chlorobenzene (25.5 g., 0.13 mole) in tetrahydrofuran (180 ml.) were added to the mixture. After initiation of the Grignard reaction, the remaining solution of 1 - bromo - 4 - chlorobenzene was added dropwise with stirring over a period of one hour. The mixture was stirred an additional hour and cooled to 0°. A solution of 2-(p-chlorophenyl)-4-picoline-N-oxide (Ia) (15 g. 0.068 mole) in tetrahydrofuran (150 ml.) was added dropwise over a period of thirty minutes. The mixture was allowed to stand at 0–10° for 16 hours and heated at 40° for one hour. The reaction mixture was cooled to 25° and water was added until precipitation of the magnesium salts was complete. The mixture was filtered and the filtrate was concentrated under reduced pressure to give an oil (yellow to red in color). The oil was dissolved in chloroform and dried over Drierite. The mixture was filtered, concentrated to an oil (aspirator) and dissolved in acetic anhydride (100 ml.). The acetic anhydride solution was allowed to stand 18 hours at room temperature. Then the solution was refluxed for three hours. Upon cooling (ice bath), crystals formed. These crystals were filtered and washed successively with ethanol and filtered. The two crops of crystals were combined and recrystallized from petroleum ether (90–110°) to give 8.7 g. (39%) of needles (II), melting point 160–164°. Recrystallization from petroleum ether gave an analytical sample, melting point 162–164°.

*Analysis.*—Calculated for $C_{18}H_{13}Cl_2N$ (percent): C, 68.80; H, 4.17; N, 4.46. Found (percent): C, 68.77 H, 4.31; N, 4.74.

2,6-di-p-chlorophenyl-4-picoline (II)

p-Chlorocrotonophenone (0.94 g., 5 mmoles) and p-chlorophenacyl pyridinium bromide (1.56 g., 5 mmoles) were placed in a small (25 ml.) round bottom flask. Ammonium acetate (2.0 g.), glacial acetic acid (3.0 ml.) and acetic anhydride (0.5 ml.) were added and the mixture was refluxed with stirring for 4 hours. The mixture was cooled and water (10 ml.) was added with stirring. The mixture was filtered. The collected solid was dried and recrystallized from petroleum ether (65–110°) to give 920 mg. (57%) of product (II), melting point 161–163°, identical by mixture melting point with an authentic sample.

2,6-di-(p-chloorphenyl)pyridine-4-carboxylic acid (III)

A solution of potassium permanganate (51.0 g., 0.32 mole) in water (1.5 liters) was added in 200 ml. portions to a refluxing solution of 2,6 - di - (p - chlorophenyl) - 4-picoline (II) (16.4 g., 0.052 mole) in pyridine (1.5 liters) over a period of about 14 hours. Refluxing was continued until the permanganate color had disappeared (usually about one hour). The solution was cooled to 25° and filtered. The manganese dioxide precipitate was washed with hot water (100 ml. 3 times). The filtrates were combined and concentrated to a volume of 300 ml. Sulfur dioxide was added until the product was completely precipitated. The mixture was filtered and the precipitate was washed with water. The filtrate was tested for complete precipitation by passing in additional sulfur dioxide. The product (III) weighed, after drying, 4.5 g. (53%), melting point 260–270°. (The yield is based on the recovery of 8.7 g. of starting material obtained by washing the manganese dioxide precipitate with chloroform). A sample of the solid product was recrystallized from ethanol to give needles, melting point 284–286° C.

*Analysis.*—Calculated for $C_{18}H_{11}Cl_2NO_2$ (percent): C, 62.81; H, 3.22; N, 4.07. Found (percent): C, 62.47; H, 3.53; N, 4.30.

Diazomethyl 2,6-di-(p-chlorophenyl)-4-pyridyl ketone (V)

A mixture of 2,6 - di-(p-chlorophenyl) pyridine-4-carboxylic acid (III) (5.3 g., 0.017 mole) and thionyl chloride (50 ml.) was refluxed 5 hours. Excess thionyl chloride was removed under reduced pressure. Residual thionyl chloride was removed by azeotroping with benzene under reduced pressure. The resulting yellow crystalline acid chloride (IV) was added in portions to a cooled (0°) and stirred ethereal solution of diazomethane (ca. 900 mg.). The clear solution was held at −10° for 24 hours and evaporated to dryness. The crude diazomethyl ketone (V) was recrystallized from an ether-petroleum ether mixture to give 5.1 g. (80%) of product, melting point 140–142° (dec.). An analytical sample was prepared by recrystallization from ether with no change in melting point.

*Analysis.*—Calculated for $C_{19}H_{11}N_3Cl_2O$ (percent): C, 61.97; H, 3.01; N, 11.41. Found (percent): C, 61.30; H, 3.20; N, 11.44.

Alpha-bromomethyl 2,6-di-(p-chlorophenyl)-4-pyridyl ketone (VI)

Diazomethyl 2,6-di-(p-chlorophenyl)-4-pyridyl ketone (V) (5.0 g., 0.011 mole) was suspended in ether (100 ml.) and 48% of hydrobromic acid (10 ml.) was added with stirring and cooling (ice bath). The suspension was stirred for two hours and diluted with water. The ether layer was separated. The aqueous layer was made alkaline with sodium carbonate and was extracted with ether. The ether extracts were combined and neutralized with saturated aqueous sodium carbonate solution. The ether layer was separated, dried (potassium carbonate), filtered, treated with charcoal, filtered and concentrated to a crystalline residue. Recrystallization from ethanol gave 4.9 g. (90%) of product (VI) melting point 147–149°.

Alpha-bromomethyl 2,6-di-(p-chlorophenyl)-4-pyridine methanol (VII)

Alpra-bromomethyl 2, 6 - di-(p-chlorophenyl) - 4-pyridyl ketone (VI) (5.0 g., 0.01 mole) was suspended in ethanol (150 ml.), cooled to 0° and a solution of sodium borohydride (500 mg.) in water (20 ml.) was added. The suspension was stirred at 0° for three hours. Hydrochloric acid (5%) was added to decompose excess of sodium borohydride and the suspension was neutralized with saturated sodium bicarbonate solution. The mixture was concentrated under reduced pressure to remove part of the ethanol, cooled and filtered. The resulting solid was washed with water, dried and recrystallized from ethanol to give 4.7 g. (90%) of product (VII), melting point 188–190°.

Alpha-dibutylaminomethyl-2,6-di-(p-chlorophenyl)-4-pyridine methanol (VIII)

Alpha-bromomethyl 2,6-di-(p-chlorophenyl)-4-pyridine methanol (4.6 g., 0.009 mole) was dissolved in ethanol (150 ml.), dibutylamine (20 ml.) was added and the solution was refluxed 18 hours. The ethanol was evaporated and the residue was dried under reduced pressure to remove excess dibutylamine. The resulting oil was dissolved in dry ether (100 ml.) and filtered to remove dibutylamine hydrobromide. The ethereal filtrate was washed with water, dried over potassium carbonate, decolorized with charcoal and filtered. The ether solution was saturated with dry hydrogen chloride and filtered to give 3.3 g. of the hydrochloride salt of the title compound, melting point 229–231°. The salt was suspended in methylene chloride and neutralized with 10% aqueous sodium hydroxide. The methylene chloride layer was separated, dried over potassium carbonate, filtered and evaporated to give 2.6 g. (51%) of a clear oil (VIII) where the alkyl groups R and $R_1$ are butyl.

*Analysis.*—Calculated for $C_{27}H_{32}N_2OCl_2$ (percent): C, 68.72; H, 6.89. Found (percent): C, 68.55; H, 7.01.

Inasmuch as the free base was an oil, the compound was reconverted to the hydrochloride salt. The oil (2.5 g.) was dissolved in ether and treated with dry hydrogen chloride. The hydrochloride salt was filtered and recrystallized from an ethanol-ether mixture to give 2.4 g. of product (VIII) as the hydrochloride, melting point 231–233°.

*Analysis.*—Calculated for $C_{27}H_{33}Cl_3N_2O$ (percent): C, 63.89; H, 6.55; N, 5.52; Cl, 20.94. Found (percent): C, 63.54; H, 6.38; N, 5.51; Cl, 21.20.

EXAMPLE II

Alpha-dihexylaminomethyl-2,6-di-(p-chlorophenyl)-4-pyridine methanol hydrochloride (VIII)

Alpha-bromomethyl 2,6-di-(p-chlorophenyl)-4-pyridine methanol (VII) (4.8 g. 0.0093 mole) was dissolved in ethanol (150 ml.) and dihexylamine (20 ml.) was added. The solution was refluxed 18 hours. Work up of the reaction mixture was the same as for the preceding alpha-dibutylamino analog. The crude oily product (VIII) where the alkyl groups R and $R_1$ are hexyl was dissolved in ether and treated with anhydrous hydrogen chloride to give a solid hydrochloride salt. The hydrochloride salt was recrystallized from ethanol (three times) to give 1.7 g. (27%) of product (VIII) as the hydrochloride, melting point 210–211°.

*Analysis.*—Calculated for $C_{31}H_{41}N_2Cl_3O$ (percent): C, 66.01; H, 7.33; N, 4.97; Cl, 18.86. Found (percent): C, 65.85; H, 7.25; N, 5.13; Cl, 19.02.

In the manner of Examples I and II various alpha-dilower alkyl aminomethyl 2,6-di-(p-chlorophenyl)-4-pyridine methanols were prepared by reacting various dilower alkyl amines containing methyl, ethyl, propyl, butyl, pentyl and hexyl groups, whether straight chain or branched, with alpha-bromomethyl 2,6-di-(p-chlorophenyl)-4-pyridine methanol. In general, an organic solvent, preferably a polar organic solvent such as the lower alkanols, was used. A molar excess of the amine is used to act as an acid acceptor in the reaction. With dimethylamine a closed system should be used in addition because it is a gas under ambient conditions. Alternative procedures, or modifications, are available which avoid the use of diazomethane as a chain extender. This includes the following sequence which was successfully used. This sequence employs an alkoxymagnesium malonic ester such as, for example, dimethyl or diethyl ester of methoxymagresium- or ethoxymagnesium-malonic acid. Diethyl ethoxymagnesium malonate is preferred.

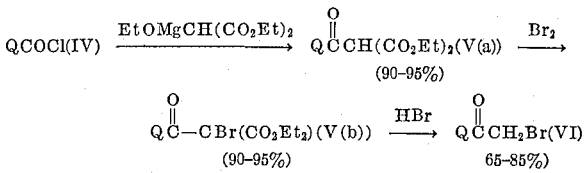

This chain extending type of reaction is generally known to the prior art.

The antimalarial compounds of the present invention have been shown to be effective in malaria-infected (intraperitoneal injection of *Plasmodium berghei*) mice to obtain what are considered to be cures and have a very low level of toxicity, such that no toxicity was exhibited at these dosages. The mice used were non-inbred ICR/Ha Swiss mice. Thus, at dosages between about 20 and 640 mg. per kg. of body weight, mice were shown to have an increased rate of survival for a period of sixty days in standard antimalarial tests when the compounds were injected subcutaneously in sterile sesame or peanut oil solution or suspension as the amine hydrochloride salt. At dosage levels of about 600 mg. per kg. and above, all of the mice were cured. It was also found that the compounds were non-phototoxic. The results are shown in the following Tables I and II.

TABLE I

[alpha-Dibutylaminomethyl-2,6-di-(p-chlorophenyl)-4-pyridine methanol hydrochloride]

| No. of tests | Animal | No. | Sex | Treatment, days | Route | Dose (mg./kg.) | Daily mortality (Day/No.) | Cures | MSTT[1] | MSTC[2] | T-C[3] | Tox[4] | MSTX[5] | Result |
|---|---|---|---|---|---|---|---|---|---|---|---|---|---|---|
| 1 | Mice | 05 | F | 3 | SC | 20 | 06/02, 07/01, 11/01, 12/01 | 00 | 8.4 | 6.1 | 2.3 | 00 | 0 | |
| 1 | do | 05 | F | 3 | SC | 40 | 18/01, 19/01, 22/01, 24/01, 26/01 | 00 | 21.8 | 6.1 | 15.7 | 00 | 0 | Active. |
| 1 | do | 05 | F | 3 | SC | 80 | 21/01, 26/01 | 03 | 23.5 | 6.1 | 17.4 | 00 | 0 | Cure. |
| 1 | do | 05 | F | 3 | SC | 160 | 21/01, 30/01 | 03 | 25.5 | 6.1 | 19.4 | 00 | 0 | Do. |
| 1 | do | 05 | F | 3 | SC | 320 | 32/01 | 04 | 32.0 | 6.1 | 25.9 | 00 | 0 | Do. |
| 1 | do | 05 | F | 3 | SC | 640 | | 05 | | 6.1 | | 00 | 0 | Do. |

[1] Mean survival time treated mice (days).
[2] Mean survival time control mice (days).
[3] Change in survival time (days).
[4] Toxic deaths.
[5] Mean survival time toxicity.

TABLE II

[Alpha-dibutylaminomethyl-2,6-di-(p-chlorophenyl)-4-pyridine methanol hydrochloride

| No. of test | Animal | No. | Sex | Treatment days | Route | Dose (mg./kg.) | Daily mortality (Day/No.) | Cures | MSTT[1] | MSTC[2] | T-C[3] | Tox[4] | MSTX[5] | Result |
|---|---|---|---|---|---|---|---|---|---|---|---|---|---|---|
| 1 | Mice | 05 | M | 3 | SC | 40 | 06/01, 08/01, 09/01, 10/01, 13/01 | 00 | 9.2 | 6.1 | 3.1 | 00 | 0 | |
| 1 | do | 05 | M | 3 | SC | 160 | 15/01, 16/02 | 02 | 15.7 | 6.1 | 9.6 | 00 | 0 | Cure. |
| 1 | do | 05 | M | 3 | SC | 640 | | 05 | | 6.1 | | 00 | 0 | Do. |
| 3 | do | 05 | F | 3 | SC | 20 | 06/01, 07/03, 08/01 | 00 | 7.0 | 6.1 | .9 | 00 | 0 | |
| 3 | do | 05 | F | 3 | SC | 40 | 07/02, 09/01, 11/01, 12/01 | 00 | 9.2 | 6.1 | 3.1 | 00 | 0 | |
| 3 | do | 05 | F | 3 | SC | 80 | 10/01, 11/01, 15/01, 25/01 | 01 | 15.3 | 6.1 | 9.2 | 00 | 0 | Do. |
| 3 | do | 05 | F | 3 | SC | 160 | 15/01, 18/02 | 02 | 17.0 | 6.1 | 10.9 | 00 | 0 | Do. |
| 3 | do | 05 | F | 3 | SC | 320 | 24/01, 25/01, 28/01 | 02 | 25.7 | 6.1 | 19.6 | 00 | 0 | Do. |
| 3 | do | 05 | F | 3 | SC | 640 | | 05 | | 6.1 | | 00 | 0 | Do. |

[1] Mean survival time treated mice (days).
[2] Mean survival time control mice (days).
[3] Change in survival time (days).
[4] Toxic deaths.
[5] Mean survival time toxicity.

As can be seen from the foregoing discussion and Tables I and II, the antimalarial compounds are very active in the standard mouse tests.

The foregoing description is intended to be only illustrative of the present invention and it is intended that this invention be limited by the hereinafter appended claims.

We claim:
1. A compound of the group consisting of alpha-dilower alkylaminomethyl - 2,6-di-(p-chlorophenyl)-4-pyridine methanol and pharmaceutically acceptable acid addition salts thereof.
2. The compound of claim 1 wherein the lower alkyl groups are butyl as the hydrochloride salt.
3. The compound of claim 1 wherein the lower alkyl groups are hexyl as the hydrochloride salt.
4. The process for the preparation of alpha-dilower alkyl aminomethyl 2,6 - di(p-chlorophenyl) - 4 - pyridine methanols (VIII) and pharmaceutically acceptable acid addition salts thereof which comprises:
  (a) reacting p-chlorophenyl Grignard reagent successively with the N-oxides of 4-picoline and 2-(p-chlorophenyl) - 4 - picoline to produce 2,6-di - (p-chlorophenyl)-4-picoline (II);
  (b) oxidizing the methyl group of the picoline (II) to produce 2,6-di-(p-chlorophenyl) pyridine-4-carboxylic acid (III);
  (c) reacting the pyridine-4-carboxylic acid (III) successively with an acid chloride, diazomethane and hydrobromic acid in a conventional chain-extending reaction to produce alpha-bromomethyl 2,6-di-(p-chlorophenyl)-4-pyridyl ketone (VI);
  (d) reducing the ketone (VI) with a reducing agent to produce alpha-bromomethyl 2,6-di-(p-chlorophenyl)-4-pyridine methanol (VII);
  (e) reacting the alpha-bromomethanol (VII) with a molar excess of a dilower alkyl amine in an organic solvent to produce the product (VIII); and
  (f) separating the product (VIII).

References Cited

Burger, Medicinal Chemistry, second edition, Interscience, pp. 814–850 (1960).

ALAN L. ROTMAN, Primary Examiner

U.S. Cl. X.R.

260—290HL, 294.8-R, 295-S, 297-R, 295-R; 424—263, 266

PO-1050
(5/69)

UNITED STATES PATENT OFFICE
CERTIFICATE OF CORRECTION

Patent No. 3,600,396          Dated August 17, 1971

Inventor(s) Arthur B. Ash et al.

It is certified that error appears in the above-identified patent and that said Letters Patent are hereby corrected as shown below:

Column 7-8, in the heading of TABLE II, "Alpha-dibutylaminomethyl-" should be --Alpha-dihexylaminomethyl- --.

Signed and sealed this 7th day of March 1972.

(SEAL)
Attest:

EDWARD M. FLETCHER, JR.           ROBERT GOTTSCHALK
Attesting Officer          Commissioner of Patents